United States Patent
Zhang

(10) Patent No.: US 12,099,403 B2
(45) Date of Patent: Sep. 24, 2024

(54) DEVICE FAILURE REPAIR METHOD AND APPARATUS, ELECTRONIC DEVICE, AND STORAGE MEDIUM

(71) Applicant: Hangzhou Hikvision Digital Technology Co., Ltd., Hangzhou (CN)

(72) Inventor: Kaijun Zhang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 119 days.

(21) Appl. No.: 18/046,676

(22) Filed: Oct. 14, 2022

(65) Prior Publication Data
US 2023/0061066 A1 Mar. 2, 2023

Related U.S. Application Data

(63) Continuation of application No. PCT/CN2021/074410, filed on Jan. 29, 2021.

(30) Foreign Application Priority Data

Apr. 15, 2020 (CN) .......................... 202010293809.3

(51) Int. Cl.
G06F 11/07 (2006.01)
H04L 41/0659 (2022.01)
H04N 17/00 (2006.01)

(52) U.S. Cl.
CPC ...... *G06F 11/0793* (2013.01); *G06F 11/0709* (2013.01); *H04L 41/0661* (2023.05); *H04N 17/002* (2013.01)

(58) Field of Classification Search
CPC .... G06F 11/0793; G06F 11/0709; G06F 8/65; H04L 41/0661; H04L 41/082; H04L 41/0853; H04L 67/06; H04N 17/002
See application file for complete search history.

(56) References Cited

U.S. PATENT DOCUMENTS 9,912,556 B1 * 3/2018 Hendin ............... H04L 43/0817
11,886,282 B2 * 1/2024 Zhang ................. G06F 11/1438
(Continued)

FOREIGN PATENT DOCUMENTS

CN 1859162 A 11/2006
CN 101042651 A 9/2007
(Continued)

OTHER PUBLICATIONS

International Search Report and Written Opinion issued in PCT Application No. PCT/CN2021/074410, dated Apr. 23, 2021 (English Translation provided).

*Primary Examiner* — Matthew M Kim
*Assistant Examiner* — Matthew N Putaraksa
(74) *Attorney, Agent, or Firm* — NORTON ROSE FULBRIGHT US LLP

(57) ABSTRACT

The embodiments of the present application propose a method and apparatus for repairing a device failure, electronic device and storage medium. The method includes: detecting, after a device restarts, whether there is an abnormal state file saved by a CPU due to a device failure detected before the restart; reading network configuration information of a Uboot saved correspondingly to the abnormal state file when the abnormal state file of the device is detected; initiating a communication connection with a FTP server according to the read network configuration information of the Uboot; sending an upgrade request to the FTP server when the communication connection with the FTP server is successfully established; repairing and upgrading the device in response to a software package returned by the FTP server. The embodiments of the present application realize remote repair of a device failure.

11 Claims, 5 Drawing Sheets

(56) References Cited

U.S. PATENT DOCUMENTS

| | | | | |
|---|---|---|---|---|
| 2011/0055822 A1* | 3/2011 | Hsieh | ............... | H04L 43/0817 |
| | | | | 717/173 |
| 2012/0254599 A1* | 10/2012 | Kim | ............... | G06F 9/4401 |
| | | | | 713/1 |
| 2013/0185390 A1* | 7/2013 | Kovacsiss, III | .... | H04L 63/0209 |
| | | | | 709/217 |
| 2016/0070496 A1* | 3/2016 | Cohen | ............... | G06F 3/0644 |
| | | | | 711/103 |
| 2016/0224428 A1 | 8/2016 | Lo | | |
| 2021/0036918 A1* | 2/2021 | Singla | ............... | H04L 63/0869 |
| 2021/0286530 A1* | 9/2021 | Suryanarayana | ... | G06F 21/6218 |

FOREIGN PATENT DOCUMENTS

| | | | |
|---|---|---|---|
| CN | 101296135 | | 10/2008 |
| CN | 103970564 | | 8/2014 |
| CN | 108694093 | | 10/2018 |
| CN | 116795600 A | * | 9/2023 |
| WO | WO 2018076169 | | 5/2018 |

\* cited by examiner

DEVICE FAILURE REPAIR METHOD AND APPARATUS, ELECTRONIC DEVICE, AND STORAGE MEDIUM

CROSS-REFERENCE TO RELATED APPLICATIONS

This application is a continuation of International Patent Application No. PCT/CN2021/074410, filed on Jan. 29, 2021, which claims priority to Chinese Patent Application No. 202010293809.3, filed with the China National Intellectual Property Administration on Apr. 15, 2020 and entitled "DEVICE FAILURE REPAIR METHOD AND APPARATUS, ELECTRONIC DEVICE, AND STORAGE MEDIUM". The disclosures of these applications are incorporated herein by reference in their entireties.

TECHNICAL FIELD

The present application relates to the technical field of device maintenance, and in particular, to a method and apparatus for repairing a device failure, electronic device and storage medium.

BACKGROUND

With the increasing demand for public safety, video surveillance technology with a camera as core is widely used in large public places such as roads, shopping malls, airports and railway stations and the like. The video surveillance system is consisted of processes such as camera shooting, transmission, control, display and recording and the like. A front-end device such as a camera acts as the main body of the camera shooting and is the core part of the video surveillance system. The stability and reliability of the front-end device largely determine the overall performance of the video surveillance system.

In practical application scenarios, there are a large number of front-end devices of various types, and each front-end device need to load the corresponding software to operate, but device problems caused by software problems become the bottleneck restricting the reliability of the device. Simple software problems can generally be resolved by simply restoring or restarting the device. However, when the device has a serious software problem, such as the user modifies a parameter, which causes the service process to exit without completing the startup, or the technician inadvertently upgrades an abnormal program, which causes the device to hang up, the above phenomenon still exists after the restart. For this case, at present, there is no suitable means to remotely repair the failed device. Therefore, the maintenance personnel can only go to the site to dismantle the device and use the serial port to repair and upgrade, which increases the labor and time costs. Moreover, this repair method has a long time cycle and damages the user's product experience.

At present, there is no solution to the problem of remote repair when a serious software problem occurs in a front-end device of video surveillance system.

SUMMARY

The embodiments of the present application propose a method and apparatus for repairing a device failure, electronic device and storage medium, so as to implement remote repair of a device failure. The technical solutions of the embodiments of the present application are implemented as follows.

In a second aspect, an embodiment of the present application provides a method for repairing a device failure. The method includes: detecting, after a device is powered on, whether there is an abnormal state file saved by a processor due to a device failure in the device; acquiring network configuration information of a Uboot of the device when the abnormal state file of the device is detected, wherein the network configuration information of the Uboot includes an address of a server; initiating a communication connection with the server according to the address of the server in the network configuration information of the Uboot; sending an upgrade request to the server upon the communication connection with the server is successfully established; repairing and upgrading the device in response to a software package returned by the server.

In the embodiments of the present application, when a device failure occurs, the latest software package is obtained through remote interaction with the FTP server to complete the repair and upgrade, which realizes automatic remote repair of the device failure without manual participation and reduces device maintenance costs.

BRIEF DESCRIPTION OF THE DRAWINGS

In order to more clearly illustrate the embodiments of the present application and the technical solutions of the prior art, the accompanying drawings that need to be used in the embodiments and the prior art will be briefly described below. Obviously, the accompanying drawings descripted below are for only some of embodiments of the present application. Those skilled in the art can also obtain other accompanying drawings according to these accompanying drawings without any creative effort.

DETAILED DESCRIPTION

In order to make the objective, technical solutions and advantages of the present application clearer and more understandable, the present application will be described in more detail below with reference to the accompanying drawings and examples. Obviously, the described embodiments are only some, and not all, of the embodiments of the present application. All other embodiments obtained based on the embodiments in the present application by those skilled in the art without any creative efforts fall within the scope of protection of the present application.

For the convenience of understanding, the following explanations are given first.

Uboot (Universal Boot Loader): a Boot Loader mainly used in embedded terminals.

FTP (File Transfer Protocol): one of the protocols in the TCP (Transfer Control Protocol)/IP (Internet Protocol) group.

Front-end device: referring to various types of device distributed in the detection site, and in this application, referring to a camera and a related device.

Daemon process: the process running in the device that provides system-like services.

Service process: the process that realizes the specific software functions of a device, for example service functions such as preview, storage, communication and the like.

SVN (Subversion): a control system of software version.

Figure 1:
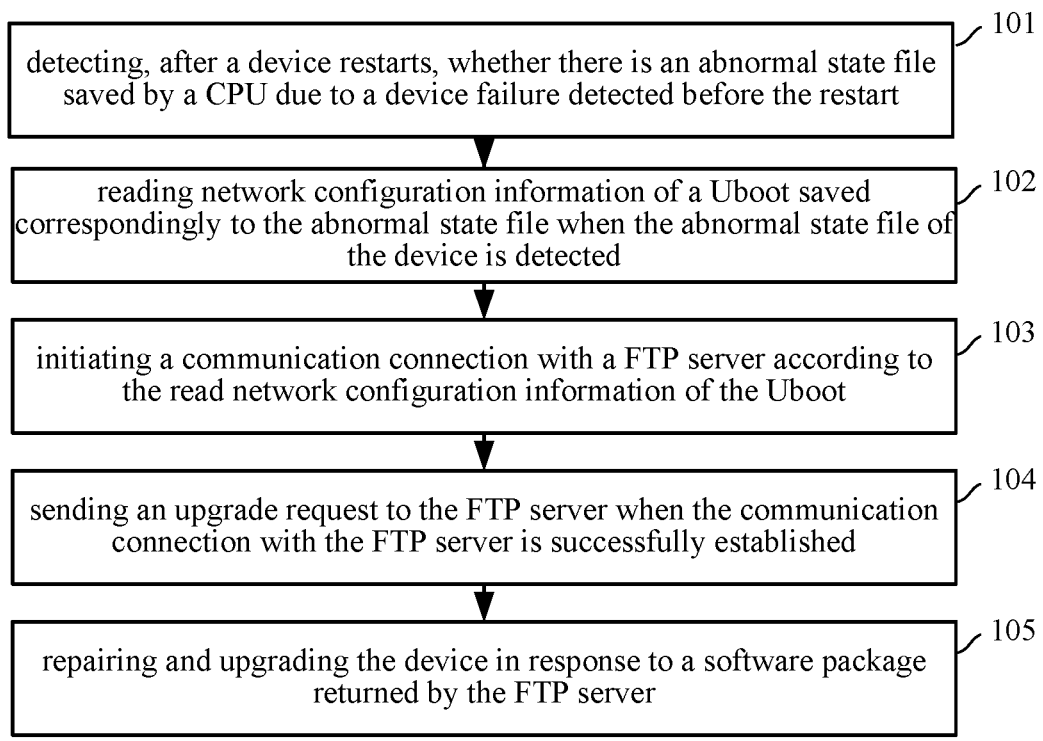
FIG. 1 is a flowchart of a method for repairing a device failure provided by an embodiment of the present application.

In order to realize automated remote repair of a device failure, an embodiment of the present application provides a method for repairing a device failure, the flowchart of which is shown in FIG. 1, and the specific steps of which are as follows:

step 101: detecting, after a device restarts, whether there is an abnormal state file saved by a CPU due to a device failure detected before the restart.

The method for repairing a device failure in the embodiment of the present application may be implemented by a front-end device. Specifically, the front-end device may be a camera or a device related to a camera.

step 102: reading network configuration information of a Uboot saved correspondingly to the abnormal state file when the abnormal state file of the device is detected.

In an optional embodiment, the network configuration information of the Uboot includes an IP address of the device, a gateway of the device, a subnet mask and an address of a FTP server. In one example, one device corresponds to one piece of network configuration information of the Uboot.

step 103: initiating a communication connection with a FTP server according to the read network configuration information of the Uboot.

step 104: sending an upgrade request to the FTP server when the communication connection with the FTP server is successfully established.

step 105: repairing and upgrading the device in response to a software package returned by the FTP server.

In the above embodiment, when a device failure occurs, the latest software package is obtained through remote interaction with the FTP server to complete the repair and upgrade, which realizes the automatic remote repair of the device failure without manual participation, which reduces costs of device maintenance.

Figure 2:
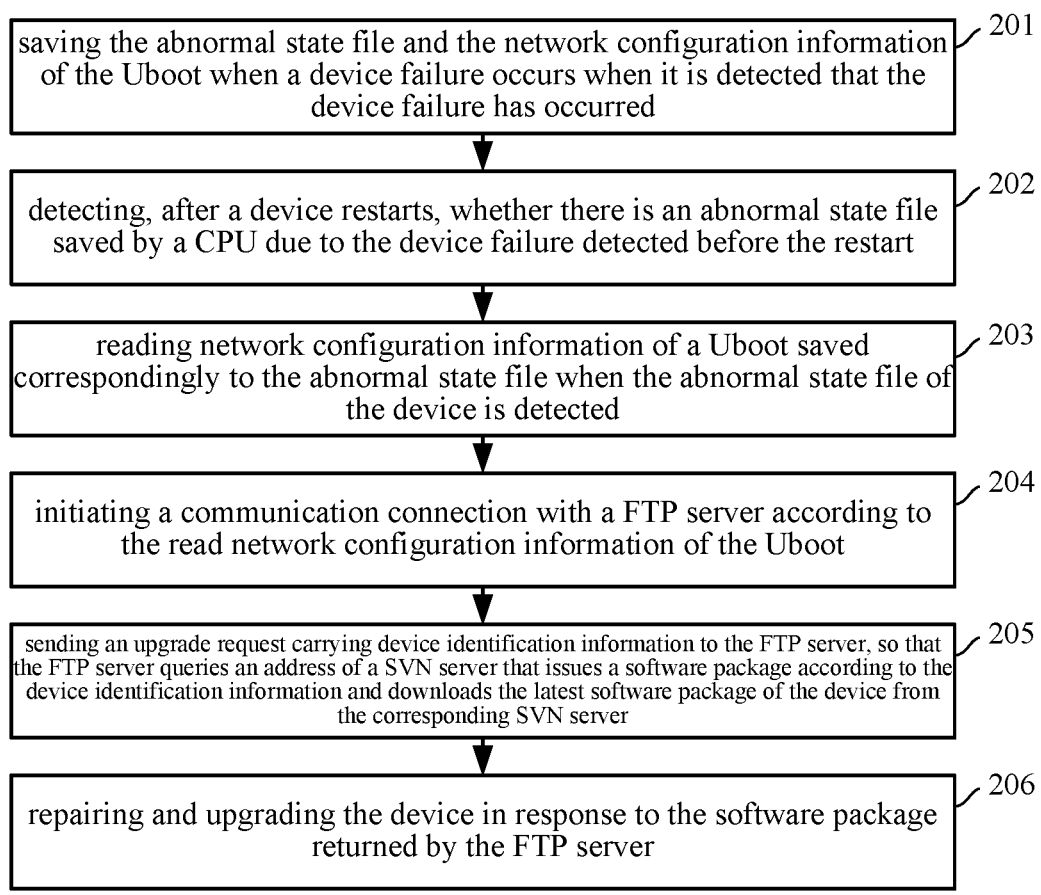
FIG. 2 is a flowchart of a method for repairing a device failure provided by another embodiment of the present application.

FIG. 2 is a flowchart of a method for repairing a device failure provided by another embodiment of the present application, and the specific steps of the method are as follows:

step 201: saving the abnormal state file and the network configuration information of the Uboot when a device failure occurs when it is detected that the device failure has occurred.

In an optional embodiment, detecting that a device failure has occurred includes: restarting a service process of the device if it is detected that the service process has exited; determining that the device failure has occurred if it is detected that the service process has failed to restart for a preset number of consecutive times.

In an optional embodiment, detecting the service process has exited includes: periodically sending a keep-alive packet to the service process; determining that the service process has exited if no keep-alive packet is received from the service process within a preset keep-alive waiting time period.

In an optional embodiment, detecting that the service process has failed to restart for a preset number of consecutive times includes: sending a startup completion query packet to the service process every preset startup query time period; determining that the service process has failed to restart if a preset number of startup completion query packets have been continuously sent but no startup completion packet is received from the service process.

step 202: detecting, after a device restarts, whether there is an abnormal state file saved by a CPU due to the device failure detected before the restart;

Step 203: reading network configuration information of a Uboot saved correspondingly to the abnormal state file when the abnormal state file of the device is detected.

step 204: initiating a communication connection with a FTP server according to the read network configuration information of the Uboot.

step 205: sending an upgrade request carrying device identification information to the FTP server, so that the FTP server queries an address of a SVN (Subversion) server that issues a software package according to the device identification information and downloads the latest software package of the device from the corresponding SVN server.

Step 206: repairing and upgrading the device in response to the software package returned by the FTP server.

In the above embodiment, it is determined that the device is abnormal if it is detected that the service process has exited, and then it is determined that the device failure has occurred if it is detected that the service process has failed to restart for a preset number of consecutive times, thus realizing accurate determination of the device failure. The address of the SVN server that issues the software package can be queried according to the device identification information, so that the latest software package of the device can be accurately downloaded.

Figure 3:
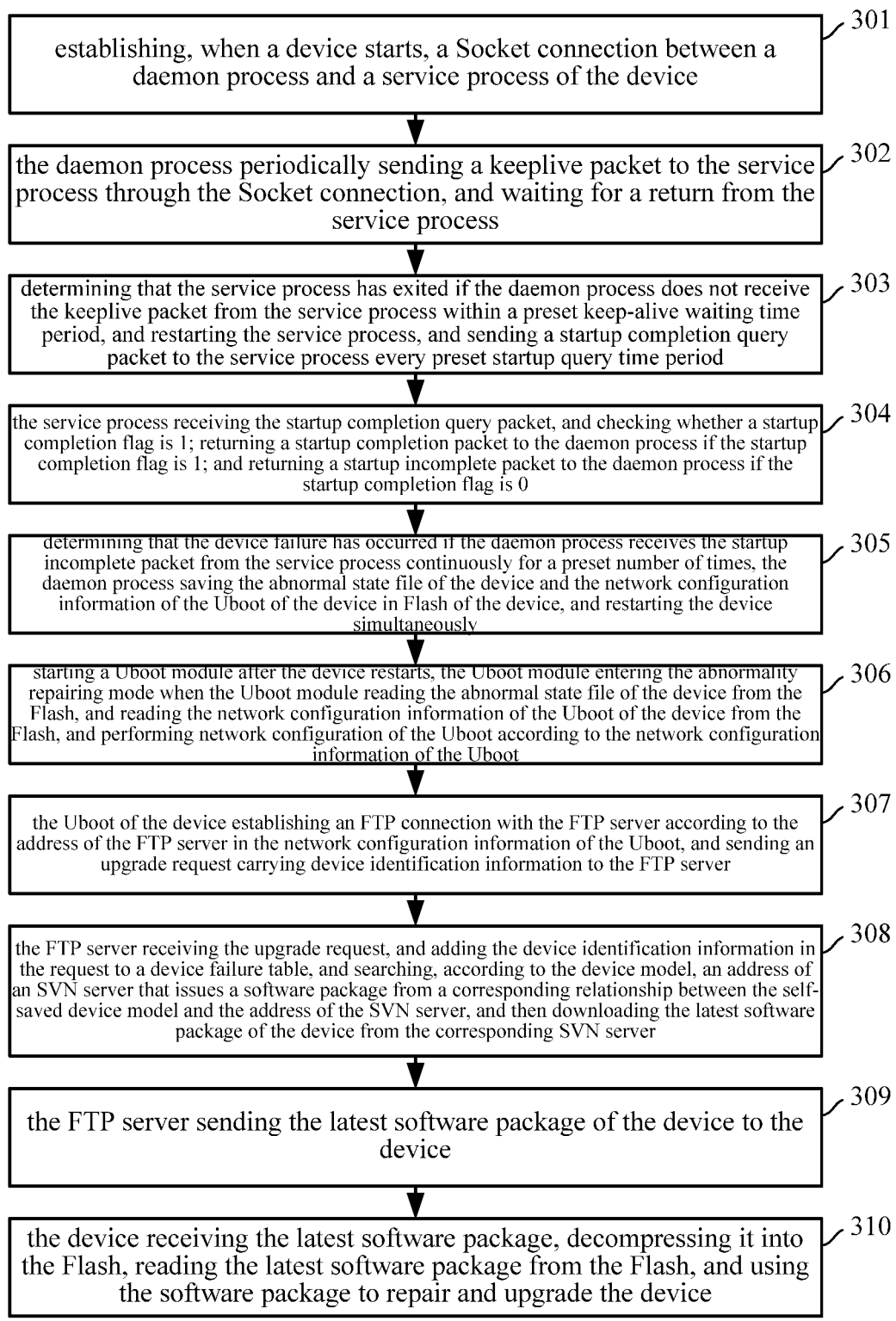
FIG. 3 is a flowchart of a method for repairing a device failure provided by yet another embodiment of the present application.

FIG. 3 is a flowchart of a method for repairing a device failure provided by another embodiment of the present application, and the specific steps of the method are as follows.

Step 301: establishing, when a device starts, a Socket connection between a daemon process and a service process of the device.

Step 302: the daemon process periodically sending a keeplive packet to the service process through the Socket connection, and waiting for a return from the service process.

For example, the daemon process sends a keeplive packet to the service process every 1 s (seconds).

Step 303: determining that the service process has exited if the daemon process does not receive the keeplive packet from the service process within a preset keep-alive waiting time period, and restarting the service process, and sending a startup completion query packet to the service process every preset startup query time period.

In an example, the startup query time period is, for example, 5 s.

Step 304: the service process receiving the startup completion query packet, and checking whether a startup completion flag is 1; returning a startup completion packet to the daemon process if the startup completion flag is 1; and returning a startup incomplete packet to the daemon process if the startup completion flag is 0.

Step 305: determining that the device failure has occurred if the daemon process receives the startup incomplete packet from the service process continuously for a preset number of times, the daemon process saving the abnormal state file of the device and the network configuration information of the Uboot of the device in Flash (flash memory) of the device, and restarting the device simultaneously.

For example, the preset number of times is 6.

The network configuration information of the Uboot includes an IP address of the device, a gateway of the device, a subnet mask and an address of the FTP server.

Step 306: starting a Uboot module after the device restarts, the Uboot module entering the abnormality repairing mode when the Uboot module reading the abnormal state file of the device from the Flash, and reading the network configuration information of the Uboot of the device from the Flash, and performing network configuration of the Uboot according to the network configuration information of the Uboot.

The Uboot module has two operating modes, namely normal mode and abnormality repairing mode. In normal mode, the Linux kernel is directly loaded after the startup is completed.

Step 307: the Uboot of the device establishing an FTP connection with the FTP server according to the address of the FTP server in the network configuration information of the Uboot, and sending an upgrade request carrying device identification information to the FTP server.

The device identification information carried in the upgrade request includes an IP address of the device, a MAC address of the device, device model and the like.

Step 308: the FTP server receiving the upgrade request, and adding the device identification information in the request to a device failure table, and searching, according to the device model, an address of an SVN server that issues a software package from a corresponding relationship between the self-saved device model and the address of the SVN server, and then downloading the latest software package of the device from the corresponding SVN server.

Specifically, the FTP server sends a software package download request carrying the device model of the device to the SVN server. After receiving the request, the SVN server queries the latest software package according to the device model, and returns the latest software package to the FTP server.

Step 309: the FTP server sending the latest software package of the device to the device.

Step 310: the device receiving the latest software package, decompressing it into the Flash, reading the latest software package from the Flash, and using the software package to repair and upgrade the device.

After the upgrade is completed, the device sends a repair completion message carrying the device identification information to the FTP server. The FTP server deletes the device identification information from the device failure table.

If a software package corresponding to the device model does not exist in the SVN server, the SVN server prompts the maintenance personnel to generate a software package for this device model and wait for the maintenance personnel to manually repair the device. The maintenance personnel compile the software package of the device model and upload it to the FTP server. When the FTP server receives the software package for this device model uploaded by the maintenance personnel, the software package is sent to the device.

Figure 4:
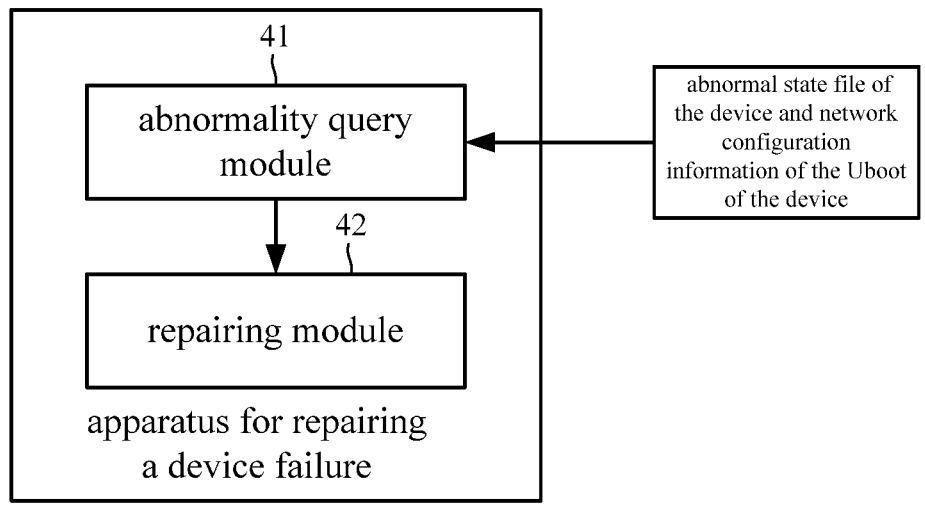
FIG. 4 is a schematic structural diagram of an apparatus for repairing a device failure provided by an embodiment of the present application.

FIG. 4 is a schematic structural diagram of an apparatus for repairing a device failure provided by an embodiment of the present application. The apparatus mainly includes an abnormality query module 41 and a repairing module 42, wherein:

the abnormality query module 41 is configured to detect, after a device restarts, whether there is an abnormal state file saved by a CPU due to a device failure detected before the restart; read network configuration information of a Uboot saved correspondingly to the abnormal state file when the abnormal state file of the device is detected.

the repairing module 42 is configured to initiate a communication connection with a FTP server according to the network configuration information of the Uboot read by the abnormality query module 41; send an upgrade request to the FTP server when a communication connection with the FTP server is successfully established; repair and upgrade the device in response to a software package returned by the FTP server.

In an optional embodiment, the repairing module 42 is configured to initiate a communication connection with a FTP server according to the network configuration information of the Uboot read by the abnormality query module 41, includes: performing network configuration of the Uboot according to an IP address of the device, a gateway of the device, a subnet mask and an address of the FTP server in the network configuration information of the Uboot, and initiating the communication connection with the FTP server.

In an optional embodiment, the repairing module 42 is configured to send an upgrade request to the FTP server, includes: sending an upgrade request carrying the device identification information to the FTP server, so that the FTP server queries an address of a SVN server that issues a software package according to the device identification information.

In an optional embodiment, the abnormality query module 41 is configured to detect whether there is an abnormal state file saved by a CPU due to a device failure detected before the restart, includes: detecting whether there is an abnormal state file saved by the CPU due to the device failure detected before the restart in a flash memory.

The abnormality query module 41 is configured to read network configuration information of a Uboot saved correspondingly to the abnormal state file, includes: reading the network configuration information of the Uboot saved correspondingly to the abnormal state file from the flash memory.

In an optional embodiment, the abnormal state file and the network configuration information of the Uboot read by the abnormality query module 41 are the abnormal state file and network configuration information of the Uboot of the device saved when the failure occurs when it is detected that a device failure has occurred.

In an optional embodiment, the above-mentioned apparatus is located on a front-end device.

Figure 5:
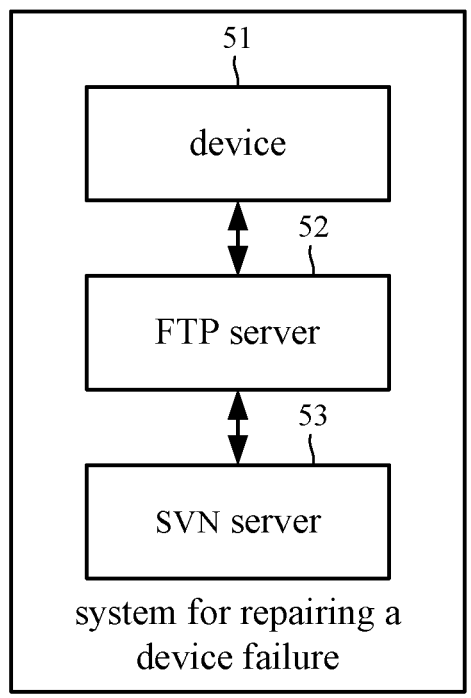
FIG. 5 is a schematic structural diagram of a system for repairing a device failure provided by an embodiment of the present application.

FIG. 5 is a schematic structural diagram of a system for repairing a device failure provided by an embodiment of the present application. The system mainly includes a device 51, a FTP server 52 and a SVN server 53, wherein:

the device 51 is configured to detect, after a device restarts, whether there is an abnormal state file saved by a CPU due to a device failure detected before the restart; read network configuration information of a Uboot saved correspondingly to the abnormal state file when the abnormal state file of the device is detected; initiate a communication connection with the FTP server 52 according to the read network configuration information of the Uboot; send an upgrade request to the FTP server 52 when the communication connection with the FTP server 52 is successfully established; repair and upgrade the device 51 in response to a software package returned by the FTP server 52.

In an optional embodiment, the device 51 is configured to initiate a communication connection with the FTP server 52 according to the read network configuration information of the Uboot, includes: performing network configuration of the Uboot according to an IP address of the device, a gateway of the device, a subnet mask and an address of the FTP server in the network configuration information of the Uboot, and initiating the communication connection with the FTP server 52.

In an optional embodiment, the device 51 is configured to send an upgrade request to the FTP server 52, includes: sending an upgrade request carrying device identification information to the FTP server 52, so that the FTP server 52 queries an address of a SVN server 53 that issues a software package according to the device identification information.

In an optional embodiment, the device 51 is configured to detect whether there is an abnormal state file saved by a CPU due to a device failure detected before the restart, includes: detecting whether there is an abnormal state file saved by the CPU due to the device failure detected before the restart in a flash memory.

The device 51 is configured to read network configuration information of a Uboot saved correspondingly to the abnormal state file, includes: reading the network configuration information of the Uboot saved correspondingly to the abnormal state file from the flash memory.

In an optional embodiment, the abnormal state file and network configuration information of the Uboot read by the device 51 are the abnormal state file and network configuration information of the Uboot of the device saved when a failure occurs when it is detected the device failure has occurred.

In an optional embodiment, the device 51 detects that a device failure has occurred, includes: restarting a service process of the device if it is detected that the service process has exited; determining that the device failure has occurred if it is detected that the service process has failed to restart for a preset number of consecutive times.

In an optional embodiment, the device 51 detects that the service process has exited, includes: periodically sending a keep-alive packet to the service process; determining that the service process has exited if no keep-alive packet is received from the service process within a preset keep-alive waiting time period.

In an optional embodiment, the device 51 detects that the service process has failed to restart for a preset number of consecutive times, includes: sending a startup completion query packet to the service process every preset startup query time period; determining that the service process has failed to restart if a preset number of startup completion query packets have been continuously sent but no startup completion packet is received from the service process.

In an optional embodiment, the device 51 is a front-end device.

The FTP server 52 is configured to receive the upgrade request sent by the device 51, obtain the latest software package of the device from the SVN server 53, and send the latest software package to the device 51.

In an optional embodiment, the FTP server 52 queries the address of the SVN server that issues the software package according to the device identification information carried in the upgrade request, and downloads the latest software package of the device from the corresponding SVN server.

The SVN server 53 is configured to provide the latest software package of the device 51 to the FTP server 52.

The device in this embodiment of the present application may be a front-end device.

Figure 6:
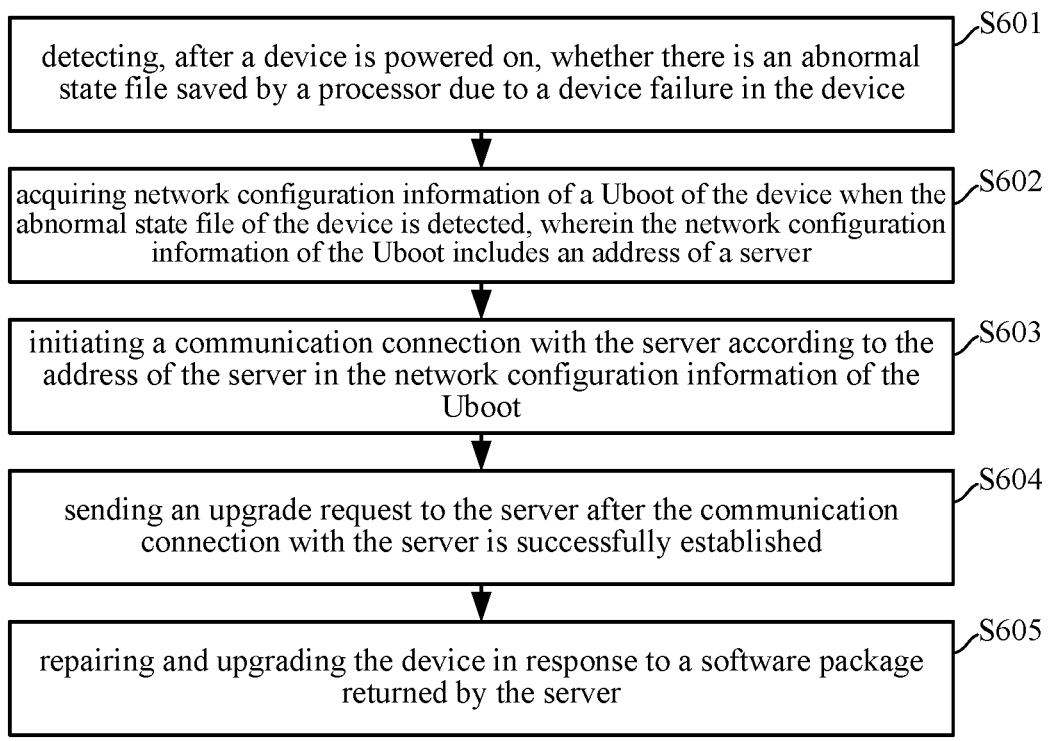
FIG. 6 is a flowchart of a method for repairing a device failure provided by another embodiment of the present application.

An embodiment of the present application provides a method for repairing a device failure. Referring to FIG. 6, the method includes:

S601, detecting, after a device is powered on, whether there is an abnormal state file saved by a processor due to a device failure in the device.

The method for repairing a device failure in the embodiment of the present application may be implemented by a front-end device. Specifically, the front-end device may be a camera or a device related to the camera. The device is powered on means that the device is connected to a power source and started. After the device is powered on, the method for repairing a device failure in the present application can be executed by a processor, such as FPGA (Field Programmable Gate Array), ASIC (Application Specific Integrated Circuit), SoC (System on Chip) and the like, in the device before the system program of the device is loaded; or the method for repairing a device failure in the present application can be executed after the system program has been loaded by the processor of the device, both of which are within the scope of protection of the present application.

S602, acquiring network configuration information of a Uboot of the device when the abnormal state file of the device is detected, wherein the network configuration information of the Uboot includes an address of a server.

One device corresponds to one piece of network configuration information of the Uboot, and the network configuration information of the Uboot includes the address of the server. The device can download the software package used for repairing and upgrading from the server according to the address of the server, so as to complete the repair and upgrade of its own program.

S603, initiating a communication connection with the server according to the address of the server in the network configuration information of the Uboot.

S604, sending an upgrade request to the server after the communication connection with the server is successfully established.

S605, repairing and upgrading the device in response to a software package returned by the server.

In a possible embodiment, the network configuration information of the Uboot further includes an IP address of the device, a gateway of the device and a subnet mask. Initiating a communication connection with the server according to the address of the server in the network configuration information of the Uboot includes: performing network configuration of the Uboot according to the IP address of the device, the gateway of the device, the subnet mask and the address of the server in the network configuration information of the Uboot, and initiating the communication connection with the server.

In a possible embodiment, the address of the server is the address of a communication server. Sending an upgrade request to the server includes: sending an upgrade request carrying identification of the device to the communication server, so that the communication server queries an address of a SVN server that issues a software package according to the identification of the device, and downloads the software package of the device from the corresponding SVN server.

In a possible embodiment, detecting whether there is an abnormal state file saved by a processor due to the device failure in the device includes: detecting whether there is an abnormal state file saved by the processor due to the device failure in a flash memory of the device. Acquiring network configuration information of the Uboot of the device includes: reading the network configuration information of the Uboot of the device from the flash memory of the device.

In a possible embodiment, the device restarts refers to a front-end device restarts.

In a possible embodiment, the method further includes: generating and saving the abnormal state file when a device failure occurs when it is detected that the device failure has occurred.

In a possible embodiment, generating and saving the abnormal state file when a device failure occurs when it is detected that the device failure has occurred includes: restarting, for each service process of the device, this service process if it is detected that this service process has exited; determining, for each service process of the device, that the device failure has occurred if it is detected that this service process has failed to restart for preset number of times, and generating and saving the abnormal state file of the device.

In a possible embodiment, restarting, for each service process of the device, this service process if it is detected that this service process has exited includes: for each service process of the device, periodically sending a keep-alive packet to this service process, determining that this service process has exited if no keep-alive packet is received from this service process within a preset keep-alive waiting time period, and restarting this service process.

In a possible embodiment, determining, for each service process of the device, that the device failure has occurred if it is detected that this service process has failed to restart for preset number of times, and generating and saving the abnormal state file of the device, includes: for each restarted service process of the device, sending a startup completion query packet to this service process every preset startup query time period, determining that the device failure has occurred if a preset number of startup completion query packets have been continuously sent but no startup completion packet is received from this service process, and generating and saving the abnormal state file of the device.

An embodiment of the present application provides an apparatus for repairing a device failure, and the apparatus includes:
- an abnormal state file detecting module, configured to detect, after a device is powered on, whether there is an abnormal state file saved by a processor due to a device failure in a device;
- a network configuration information of the Uboot acquiring module, configured to acquire network configuration information of a Uboot of the device when the abnormal state file of the device is detected, wherein the network configuration information of the Uboot includes the address of a server;
- a communication connection initiating module, configured to initiate a communication connection with the server according to the address of the server in the network configuration information of the Uboot;
- an upgrade request sending module, configured to send an upgrade request to the server when the communication connection with the server is successfully established;
- a repair and upgrade executing module, configured to repair and upgrade the device in response to a software package returned by the server.

In a possible embodiment, the network configuration information of the Uboot further includes an IP address of the device, a gateway of the device and a subnet mask. The communication connection initiating module is specifically configured to configure network of the Uboot according to the IP address of the device, the gateway of the device, the subnet mask and the address of the server in the network configuration information of the Uboot and initiate the communication connection with the server.

In a possible embodiment, the address of the server is an address of a communication server. The upgrade request sending module is specifically configured to send an upgrade request carrying identification of the device to the communication server when the communication connection with the server is successfully established, so that the communication server queries an address of a SVN server that issues a software package according to the identification of the device, and downloads the software package of the device from corresponding SVN server.

In a possible embodiment, the abnormal state file detecting module is specifically configured to detect, after a device is powered on, whether there is an abnormal state file saved by a processor due to a device failure in a flash memory of the device. The Uboot network configuration information acquiring module is specifically configured to read the network configuration information of the Uboot of the device from the flash memory of the device when abnormal state file of the device is detected.

In a possible embodiment, the device is a front-end device.

In a possible embodiment, the apparatus further includes an abnormal state file saving module, configured to generate and save an abnormal state file when a device failure occurs when it is detected that the device failure has occurred.

In a possible embodiment, the abnormal state file saving module includes: a service process restarting sub-module, configured to restart, for each service process of the device, this service process if it is detected that this service process has exited; a device failure determining sub-module configured to determine, for each service process of the device, that the device failure has occurred if it is detected that this service process has failed to restart for preset number of times, and generate and save the abnormal state file of the device.

In a possible embodiment, the service process restarting sub-module is specifically configured to: for each service process of the device, periodically send a keep-alive packet to this service process, determine that this service process has exited if no keep-alive packet is received from this service process within a preset keep-alive waiting time period, and restart this service process.

In a possible embodiment, the device failure determining sub-module is specifically configured to: for each restarted service process of the device, send a startup completion query packet to this service process every preset startup query time period, determine that the device failure has occurred if a preset number of startup completion query packets have been continuously sent but no startup completion packet is received from this service process, and generate and save the abnormal state file of the device.

An embodiment of the present application provides an electronic device, including a processor and a memory. The memory is configured to store a computer program. The processor is configured to implement the method for repairing a device failure according to any one of the embodiments of the present application when executing the program stored in the memory.

In a possible embodiment, the electronic device of the embodiment of the present application further includes a communication interface and a communication bus, wherein the processor, the communication interface and the memory communicate with each other through the communication bus.

The communication bus mentioned in the above electronic device may be a PCI (Peripheral Component Interconnect) bus or an EISA (Extended Industry Standard Architecture) bus or the like. The communication bus can be divided into an address bus, a data bus, a control bus, and the like. For ease of presentation, only one thick line is used in the figure, but it does not mean that there is only one bus or one type of bus.

The communication interface is used for communication between the above electronic device and other devices.

The memory may include RAM (Random Access Memory), or may include NVM (Non-Volatile Memory), for example at least one disk memory. Optionally, the memory may also be at least one storage device located away from the aforementioned processor.

The above-mentioned processor may be a general-purpose processor, including a CPU (Central Processing Unit), an NP (Network Processor) and the like. The above-mentioned processor may also be a DSP (Digital Signal Processing), an ASIC (Application Specific Integrated Circuit), FPGA (Field-Programmable Gate Array) or other programmable logic devices, discrete gate or transistor logic devices, discrete hardware components.

An embodiment of the present application further provide a computer-readable storage medium having stored therein a computer program, which when executed by a processor, cause the processor to implement the method for repairing a failure of a device described in the present application.

In yet another embodiment provided by the present application, a computer program product including instructions is also provided, which, when running on a computer, enables a computer to execute any one of the method for repairing a failure of a device described in the present application.

In the above-mentioned embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the processes or functions described in the embodiments of the present application are generated in whole or in part. The computer may be a general purpose computer, special purpose computer, computer network, or other programmable device. The computer instructions may be stored in a computer readable storage medium or transmitted from one computer readable storage medium to another computer readable storage medium, for example, the computer instructions may be transmitted from a website, computer, server or data center to another website, computer, server, or data center by wire (such as coaxial cable, fiber optic, digital subscriber line) or wirelessly (such as infrared, wireless, microwave, etc.). The computer-readable storage medium may be any usable medium that can be accessed by a computer or a data storage device such as a server and a data center and the like that includes an integration of one or more available media. The usable media may be magnetic media (such as a floppy disk, a hard disk, a magnetic tape), optical media (such as DVD), or semiconductor media (such as Solid State Disk (SSD)) and the like.

It should be noted that, in the present application, the technical features in each optional solution can be combined to form solutions as long as they are not contradictory, and these solutions are all within the scope of the disclosure of the present application. Relational terms such as first and second and the like are only used to distinguish one entity or operation from another and do not necessarily require or imply any such actual relationship or order between these entities or operations. Moreover, the terms "comprising", "including" or any other variations thereof are intended to encompass a non-exclusive inclusion such that a process, method, article or device that includes a series of elements includes not only those elements, but also includes other elements not explicitly listed or other elements inherent to such a process, method, article or apparatus. Without further limitation, elements defined by the phrase "comprising one . . . " do not preclude the presence of additional identical elements in a process, method, article or device that includes the mentioned elements.

The various embodiments in this specification are described in a related manner. Each embodiment focuses on the differences from other embodiments, and the same and similar parts between the various embodiments can be referred to each other.

The above descriptions are only preferred embodiments of the present application, and are not intended to limit the present application. Any modifications, equivalent replacements, improvements and the like made within the spirit and principles of the present application shall be included within the scope of protection of the present application.

The invention claimed is:

1. A method for repairing a device failure, comprising:
   detecting, after a device is powered on, whether there is an abnormal state file saved by a processor due to the device failure in the device;
   acquiring network configuration information of a Uboot of the device when the abnormal state file of the device is detected, wherein the network configuration information of the Uboot comprises an address of a server;
   initiating a communication connection with the server according to the address of the server in the network configuration information of the Uboot;
   sending an upgrade request to the server when the communication connection with the server is successfully established;
   repairing and upgrading the device in response to a software package returned by the server.

2. The method according to claim 1, wherein the network configuration information of the Uboot further comprises an IP address of the device, a gateway of the device and a subnet mask;
   wherein initiating the communication connection with the server according to the address of the server in the network configuration information of the Uboot comprises:
   performing network configuration of the Uboot according to the IP address of the device, the gateway of the device, the subnet mask and the address of the server in the network configuration information of the Uboot, and initiating the communication connection with the server.

3. The method according to claim 2, wherein the address of the server is an address of a communication server; wherein sending an upgrade request to the server comprises:
   sending an upgrade request carrying identification of the device to the communication server, so that the communication server queries an address of a Subversion (SVN) server that issues a software package according to the identification of the device, and downloads the software package of the device from the corresponding SVN server.

4. The method according to claim 1, wherein the address of the server is an address of a communication server; wherein sending an upgrade request to the server comprises:

sending an upgrade request carrying identification of the device to the communication server, so that the communication server queries an address of a Subversion (SVN) server that issues a software package according to the identification of the device, and downloads the software package of the device from the corresponding SVN server.

5. The method according to claim 1, wherein detecting, after the device is powered on, whether there is an abnormal state file saved by the processor due to the device failure in the device comprises: detecting whether there is an abnormal state file saved by the processor due to the device failure in a flash memory of the device;

wherein acquiring the network configuration information of the Uboot of the device comprises: reading the network configuration information of the Uboot of the device from the flash memory of the device.

6. The method according to claim 1, wherein the device is powered on means that the device is connected to a power source and started.

7. The method according to claim 1, wherein the method further comprises: generating and saving the abnormal state file when the device failure in the device occurs when it is detected that the device failure in the device has occurred.

8. The method according to claim 7, wherein generating and saving the abnormal state file when the device failure in the device occurs when it is detected that the device failure in the device has occurred comprises:

restarting, for each service process of the device, this service process if it is detected that this service process has exited;

determining, for each service process of the device, that the device failure in the device has occurred if it is detected that this service process has failed to restart for preset number of times, and generating and saving the abnormal state file of the device.

9. The method according to claim 8, wherein restarting, for each service process of the device, this service process if it is detected that this service process has exited comprises:

for each service process of the device, periodically sending a keep-alive packet to this service process, determining that this service process has exited if no keep-alive packet is received from this service process within a preset keep-alive waiting time period, and restarting this service process.

10. The method according to claim 9, wherein, determining, for each service process of the device, that the device failure in the device has occurred if it is detected that this service process has failed to restart for preset number of times, and generating and saving the abnormal state file of the device, comprises:

for each restarted service process of the device, sending a startup completion query packet to this service process every preset startup query time period, determining that the device failure in the device has occurred if a preset number of startup completion query packets have been continuously sent but no startup completion packet is received from this service process, and generating and saving the abnormal state file of the device.

11. The method according to claim 8, wherein, determining, for each service process of the device, that the device failure in the device has occurred if it is detected that this service process has failed to restart for preset number of times, and generating and saving the abnormal state file of the device, comprises:

for each restarted service process of the device, sending a startup completion query packet to this service process every preset startup query time period, determining that the device failure in the device has occurred if a preset number of startup completion query packets have been continuously sent but no startup completion packet is received from this service process, and generating and saving the abnormal state file of the device.

* * * * *